April 24, 1951 M. G. BALES 2,550,517
FLEXIBLE CONNECTION
Filed March 14, 1945

INVENTOR
MAX G. BALES
BY
Spencer, Hardman & Fahr
His ATTORNEYS

Patented Apr. 24, 1951

2,550,517

UNITED STATES PATENT OFFICE 2,550,517

FLEXIBLE CONNECTION

Max G. Bales, Anderson, Ind., assignor to General Motors Corporation, Detroit, Mich., a corporation of Delaware Application March 14, 1945, Serial No. 582,593

8 Claims. (Cl. 64—11)

1

This invention relates to an improved flexible coupling especially suitable for a shaft in an ignition timer distributor for an internal combustion engine, but not necessarily limited to that application.

As is well known the ignition timer distributor for an internal combustion engine is provided with a shaft which is associated with elements including weight plates, weights and levers which cooperate in a manner to drive a cam to operate a circuit breaker. These elements are enclosed within a housing of such construction that can be readily attached or removed from the crankcase of an engine. The housing is provided with a shank concentric with the shaft and extends into a well provided by the crank case. The other end of the shaft, which extends beyond the shank, has connected thereto a gear which is driven by a member or a gear rotatable with the cam shaft of the engine and these gears are subjected to acids and oils. Further the power applied by the engine driven gear to the gear carried by the timer shaft is not a constant steady power but is undulating. This is due to the inherent operation of the internal combustion engine which produces a series of torsional impacts upon the timer shaft thus causing a whipping action which in time causes wear, the loosening and the breaking of the connecting means between the shaft and the gear carried thereby.

In order to eliminate, or at least minimize, the wear and breakage of the connection between the shaft and gear a flexible coupling is incorporated in the connection between the ignition timer shaft and the gear. It is therefore an object of the present invention to provide a coupling of this type built up of wear-resisting parts including shock absorbing means which are adapted to withstand the particular uses to which the coupling is put.

Another object of the invention is to provide a flexible coupling which is efficient and reliable in operation, simple and compact in construction and one that can be economically manufactured.

Another object of the invention is to provide cushioning means having high wear resisting qualities and yet having qualities which are highly resistant to acids, oils and high temperatures.

Another object of the present invention is to provide improved means for retaining the cushioning means against drifting, due to vibrations, or torsional impacts from its normal assembled position.

Another object of the present invention is to provide means for not only absorbing torsional vibrations but also the axial vibrations that are imposed by the end thrust of a helical gear.

Further objects and advantages of the present invention are apparent from the following description reference being had to the accompanying drawings wherein a preferred embodiment of the present invention is clearly shown.

In the drawings:

Figs. 1 and 2, respectively, are end and side views of the flexible coupling embodying the present invention.

Figure 1:
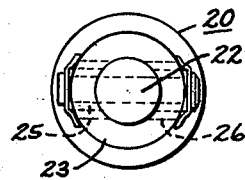
Figure 2:
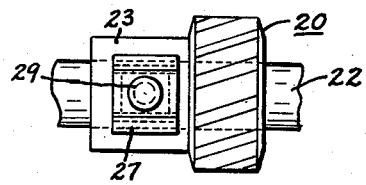
Figure 3:
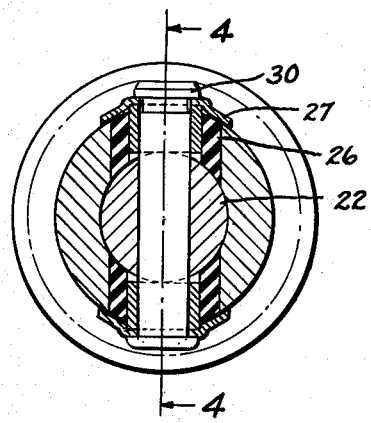
Fig. 3 shows a transverse section, on an enlarged scale, taken on line 3—3 of Fig. 4.
Figure 4:
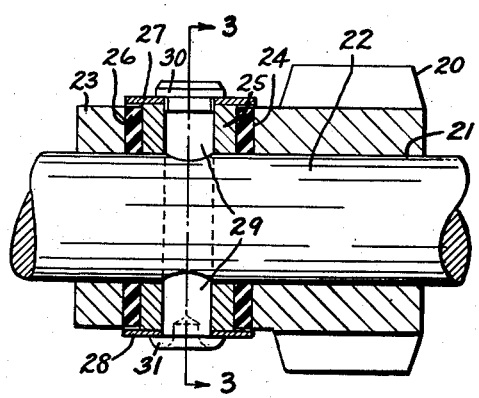
Fig. 4 is a sectional view taken on the line 4—4 of Fig. 3.
Figure 6:
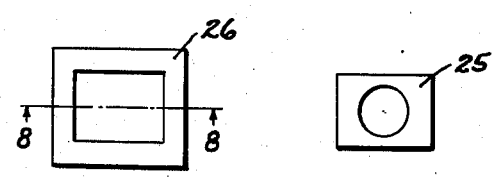
Figure 7:
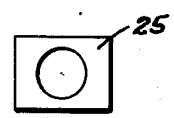

Figs. 6 and 7, respectively, are plan views of a cushioning unit and a driving block shown in section in Figs. 3 and 4.

Figure 8:

Fig. 8 is a sectional view taken on line 8—8 of Fig. 6.

Figure 5:
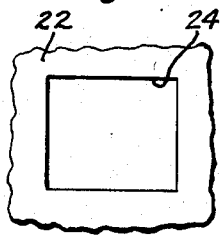
Fig. 5 is a fragment of the hub of the gear element shown in Fig. 3 and showing the contour of an opening therein.

Referring to the drawings, 20 designates an engine driven gear or member having a central bore 21 through which a shaft 22 extends with a free fit. The gear 20 has a hub 23 provided with transverse openings 24, here shown to be rectangular in formation, see Fig. 5. It is to be understood that the openings 24 could be round or any other contour if desired. The openings 24 are preferably diametrically opposite each other and each opening receives a driving block 25 and a cushion bushing 26 of soft rubber which surround the driving blocks 25. The block 25 and bushing 26 are formed so they will have substantially the same contour as the opening. The bushings 26 in the present instance are slightly larger than the spaces between the walls defining the openings 24 and the outer surfaces of the driving blocks 25. This insures the compression of the bushings 26 when same are assembled in their respective openings 24 thus providing a tight engagement with their respective driving blocks. The cushion bushings 26 are made of synthetic rubber, but they may be made of any suitable yieldable material.

In the illustrative form of the present invention, the openings 24, bushings 26, and the driving blocks 25 are shown in rectangular formation in order to provide enough cross sectional area of the rubber or yieldable material under compression. This particular formation is preferred when the parts are used in a device having small overall dimensions. It is to be understood that the openings, driving blocks and the rubber bushings need not necessarily be rectangular in formation as shown, but may be made in many other shapes provided the rubber or other yieldable material used is sufficient when under compression to produce the results desired.

The blocks 25 and the bushing 26 are held from drifting or lateral displacement from their respective opening 24 by washers 27 and 28 and a pin 29 having a head 30. The shank of the pin 29 passes through openings provided by the washers 27, 28, driving blocks 25 and the shaft 22. The end 31 of the shank may be spread over the outer face of the washer 28, in any suitable manner, to hold tightly the washers against the outer ends of the driving blocks 25. When the shank 29 is spread over the washer 28, care should be taken so that the washers do not bear against the hub 23. The washers should be free of the hub in order to assure flexibility. The central portion of the washers 27 and 28 have depressions, each depression corresponds to the end contour of the blocks 25 which receive the ends of the blocks. Thus, when the end 31 of the pin 29 is spread or riveted over the washer 28 the depression of both washers 27, 28 will mate with the end of their respective blocks to prevent the washers from turning relative to the blocks.

When the shank 29 is spread over the washer 28 the pin 29 will swell within the openings in the shaft 22 and the driving blocks 25, thus the washers 27, 28, driving blocks 25 and the shaft 22 are all held in a rigid assembled relation. Furthermore should any part of the bushings extend beyond the outer periphery of the hub before the washers are clamped against the hub the washers will force the bushings inwardly to compact the bushing further.

The shock absorbing function of the flexible coupling is due to the properties of the bushings 26. It has been found that when the bushings 26 are distorted by an applied force much of the energy is absorbed during a relatively slow return of the bushings 25 from distorted condition, due to the applied force, to the normal condition.

While the embodiment of the present invention as herein disclosed, constitutes a preferred form, it is to be understood that other forms might be adopted, all coming within the scope of the claims which follow.

What is claimed is as follows:

1. A flexible connection comprising, a sleeve and a shaft movably mounted within the sleeve, said shaft having radial projections extending through radial openings provided by the sleeve; a hollow metal member mounted on each projection; a compressed soft rubber bushing surrounding each metal member and having its outer periphery contacting the marginal walls of its respective opening; an apertured member mounted on each projection and engaging the outer end of the rubber bushings; and means for holding the members in position and for maintaining the soft rubber bushings under compression.

2. A flexible connection comprising, a driven sleeve; a shaft journaled in the sleeve; radial projections carried by the shaft and extending through respective radial openings provided by the sleeve; a driving block fitted over each projection and positioned within the marginal walls of their respective opening; a bushing of yieldable compressed material disposed about each block and substantially filling the spaces between the block and the marginal walls of their respective opening; members mounted on the projections beyond the outer ends of the blocks and bushings; and means including portions of the projections for holding the members and bushings in position and for maintaining the yieldable material under compression.

3. A flexible connection comprising; a shaft having a through passage substantially at right angles to the axis of the shaft; a driven member movably mounted on the shaft and having spaced openings extending radially of the shaft and adapted to align with the passage; a cross-member mounted within the passage of the shaft with the ends thereof projecting through the openings of the driven member; a metal bushing and a compressed bushing of yieldable material surrounding each end of the cross-members and filling the space between the metal bushing and the marginal walls of the opening; an apertured disc member mounted on opposite ends of the cross-member and engaging the outer ends of the bushings; and means including an offset portion of the cross-member for holding the discs in position and for maintaining the yieldable material under compression.

4. A flexible connection for a shaft, said shaft having a transverse passage therein; a driven member mounted on the shaft and having openings intermediate its ends on diametrically opposite sides of the shaft; a pin disposed within the shaft and extending therethrough; a driving block mounted on each end of the pin and disposed within the openings; a bushing of compressed resilient material disposed about each of the blocks; and means associated with the pin adjacent the ends thereof for holding the pin in position and for maintaining the bushings under compression.

5. A flexible connection for a shaft, said shaft having a transverse passage therein; a driven member mounted on the shaft and having openings intermediate its ends on diametrically opposite sides of the passage; a cross-member extending through the passage and having its opposite ends extending through respective openings in the driven member; a serving of compressed rubber-like material disposed about the end portions of the cross-member within the openings; retainer members mounted on each end of the cross-member and means including portions of the cross-member for holding the retainer members and cross-member in position and for maintaining the rubber-like material under compression and thereby absorb shocks of the driven member.

6. A flexible connection including, a shaft; a sleeve adapted to be driven mounted on the shaft; a projection carried by the shaft and extending laterally through an opening provided by the sleeve; a bushing of compressible material surrounding the projection; an apertured plate mounted on the projection; means including portions of the projection cooperating with the plate for maintaining the bushing under compression whereby the compressible material will absorb the shock transmitted from the sleeve to the shaft.

7. A flexible connection for a shaft, said shaft being provided with a radial projection; a driven member mounted on the shaft and having a rectangular opening; a rectangular block fitted on the projection and located within the opening; a compressed rubber member surrounding the block; a metal member mounted on the projection; and means including portions of the projection for maintaining the metal member in position and also for maintaining the rubber member under compression whereby all rotational and axial shocks tending to be transmitted from the driven member to the shaft will be absorbed by the compressed rubber member.

8. A flexible connection between a driving member and a driven member wherein a portion of one telescopes within the other with a free sliding fit, the combination comprising, a transversely disposed pin passing substantially through both members at the telescope portions, said pin having a relative close fit with respect to one member and having substantial clearance with respect to the other member; and resilient rubber-like means highly compressed surrounding the pin and between the pin and the other member and completely filling the substantial clearance therebetween for forming a shock resisting, driving connection between the two members.

MAX G. BALES.

REFERENCES CITED

The following references are of record in the file of this patent:

UNITED STATES PATENTS

| Number | Name | Date |
| --- | --- | --- |
| 2,181,183 | Guy | Nov. 28, 1939 |
| 2,276,459 | Brady | Mar. 17, 1942 |